US 6,675,233 B1

(12) United States Patent
Du et al.

(10) Patent No.: US 6,675,233 B1
(45) Date of Patent: Jan. 6, 2004

(54) AUDIO CONTROLLER FOR PORTABLE ELECTRONIC DEVICES

(75) Inventors: Sterling Du, Palo Alto, CA (US); Reginia Chan, Los Altos, CA (US)

(73) Assignee: O2 Micro International Limited, Grand Cayman (KY)

( * ) Notice: Subject to any disclaimer, the term of this patent is extended or adjusted under 35 U.S.C. 154(b) by 276 days.

(21) Appl. No.: 09/650,515

(22) Filed: Aug. 29, 2000

Related U.S. Application Data

(63) Continuation-in-part of application No. 09/595,103, filed on Jun. 16, 2000, which is a continuation of application No. 09/136,207, filed on Aug. 19, 1998, now Pat. No. 6,226,237.
(60) Provisional application No. 60/079,508, filed on Mar. 26, 1998, provisional application No. 60/182,448, filed on Feb. 15, 2000, provisional application No. 60/183,181, filed on Feb. 17, 2000, and provisional application No. 60/216,853, filed on Jul. 7, 2000.

(51) Int. Cl.⁷ .............................. G06F 13/10; G06F 1/32
(52) U.S. Cl. .............................. 710/14; 710/8; 710/62; 713/300; 713/324
(58) Field of Search ............................... 710/8, 14, 62, 710/72, 74, 10; 713/300, 310, 320, 323, 324; 700/94

(56) References Cited

U.S. PATENT DOCUMENTS

| 5,548,777 | A | | 8/1996 | Woo | 395/821 |
|---|---|---|---|---|---|
| 5,796,705 | A | | 8/1998 | Kim | 369/124 |
| 5,870,355 | A | | 2/1999 | Fujihara | 369/32 |
| 5,910,933 | A | | 6/1999 | Moore | 369/33 |
| 6,006,285 | A | * | 12/1999 | Jacobs et al. | 710/14 |
| 6,006,337 | A | * | 12/1999 | Koo | 713/320 |
| 6,038,672 | A | * | 3/2000 | Klein | 713/322 |
| 6,292,440 | B1 | * | 9/2001 | Lee | 369/7 |

FOREIGN PATENT DOCUMENTS

| EP | 0 945 778 A2 | * | 9/1999 | |
| EP | 0945778 A2 | | 9/1999 | G06F/1/32 |
| EP | 0 999 549 A2 | | 5/2000 | 20/10 |
| KR | 99078492 A | | 11/1999 | G11B/20/10 |

* cited by examiner

Primary Examiner—Ilwoo Park
(74) Attorney, Agent, or Firm—Grossman, Tucker, Perreault & Pfleger, PLLC

(57) ABSTRACT

An audio controller for use with laptop and notebook digital computers for reproducing compressed digital audio recordings. The controller includes a drive interface for traversing and accessing audio data files stored on a drive of a computer system. Function keys coupled to the controller permit users to access drives containing desired audio data. The selected audio data is read from the drive into the controller. Decoding circuitry decodes the audio data and generates a decoded audio data stream. The data stream can be converted to an analog signal by the controller, or sent to the audio subsystem of the computer system. Advantageously, the controller operates when the computer system is in an inactive state, for example in power saving mode or OFF, and operates in passthrough mode when the computer system is ON or active.

31 Claims, 4 Drawing Sheets

US 6,675,233 B1

AUDIO CONTROLLER FOR PORTABLE ELECTRONIC DEVICES

This application is a continuation-in-part application of application Ser. No. 09/595,103, filed Jun. 16, 2000, still pending, which is a continuation of application Ser. No. 09/136,207, filed Aug. 19, 1998, now U.S. Pat. No. 6,226, 237, both of which claims benefits to U.S. Provisional Patent Application No. 60/079,508, filed Mar. 26, 1998. This application also claims benefit to Provisional Application Ser. No. 60/182,448, filed Feb. 15, 2000, Provisional Application Ser. No. 60/183,181, filed Feb. 17, 2000 and Provisional Application Ser. No. 60/216,853, filed Jul. 7, 2000.

BACKGROUND OF THE INVENTION

1. Field of the Invention

The present invention relates generally to portable devices for reproducing audio recordings, and more particularly, to a device for reproducing compressed digital audio recordings. Particular utility for the present application is in the reproduction of MP3 digital audio files, especially for use with portable computers, however other utilities are contemplated herein.

2. Description of Related Art

Presently there exist various portable devices for replaying digital audio recordings that have been compressed in accordance with a compressed audio digital recording format called MP3. These devices can be divided into two classes, those which store the MP3 compressed digital audio recordings in an electronic solid state memory, and those which record the compressed digital audio for subsequent reproduction using an electro-mechanical device such as a compact disk ("CD") player or on a hard disk drive of a digital computer.

Portable devices for replaying MP3 compressed digital audio recordings that use electronic solid state memory, i.e. flash-memory, are capable of storing about ten (10) music selections. With an add-in memory card, such devices can carry a total of about twenty (20) music selections. These MP3 players that store the MP3 compressed digital audio recordings in an electronic solid state memory consume comparatively little electrical power. Thus, such MP3 players provide an extended playing interval without battery replacement or recharging for the limited number of selections which they can store.

In addition to having a capacity for only a limited number of music selections, another characteristic of portable MP3 players that store compressed digital audio recordings in an electronic solid state memory is the inconvenience associated with loading the music selections into that memory. In general, such MP3 players require first downloading or obtaining copies of MP3 compressed digital audio recordings on a hard disk drive of a personal computer, and then transferring the MP3 compressed digital audio recordings from the personal computer to the portable MP3 player. The preceding operations are to be contrasted with the simplicity of merely inserting a compact disk ("CD") into a CD player, or playing MP3 compressed digital audio recordings directly from a hard disk drive or CD drive of a digital computer.

MP3 players which preserve compressed digital audio recordings for reproduction using an electromechanical device are capable of storing many more music selections than portable MP3 players that store compressed digital audio recordings in an electronic solid state memory, e.g. hundreds or even more than one-thousand. However, usually MP3 players that use electromechanical devices require significant amounts of electrical power. Thus, portable players that reproduce music selections using an electro-mechanical device exhibit comparatively short playing interval, e.g. less than one (1.0) hour before batteries must be replaced or recharged.

Batteries used in laptop and notebook computers usually permit their operation for several hours before becoming discharged. As is readily apparent, a laptop or notebook computer can be to play MP3 compressed digital audio recordings using either the computer's CD-ROM or hard disk drive. Pending U.S. patent application Ser. No. 09/136, 207, now U.S. Pat. No. 6,226,237, entitled "Low Power CD-ROM Player for Portable Computers" that was filed on Aug. 19, 1998, which is hereby incorporated by reference in its entirety, describes how a conventional laptop or notebook computer, when simply playing a conventional music CD, consumes an unnecessarily large amount of electrical energy. Such an excessive electrical energy consumption drains a laptop or notebook computer's battery of power that is more prudently applied in performing microprocessor intensive tasks such as word processing and spreadsheet analysis. The solution presented in the '207 application is a state machine that operates when main power to the portable device is OFF. The '207 invention couples a CD-ROM to the audio subsystem (when main power is OFF) so that CDs can be played, without excessive battery drain, or without having to boot up the portable computer.

SUMMARY OF THE INVENTION

Accordingly, it is one object of the present invention to adapt laptop and notebook digital computers for reproducing compressed digital audio recordings when main power to the computer system is OFF. Another object of the present invention is to adapt laptop and notebook digital computers for storing MP3 compressed digital audio recordings into a conventional portable MP3 player using as little energy as is practicable.

In one embodiment, the present invention provides a computer system adapted to play audio files which includes a computer subsystem comprising a system CPU and a drive for storing audio data. The computer system also includes an audio controller comprising a drive interface for selectively accessing the audio data from the drive and memory for storing the audio data. Advantageously, The controller is adapted to access, store and play the audio data when power is not being supplied to said computer subsystem.

In another embodiment, the present invention provides a computer system adapted to play audio data when said computer system is inactive, the computer system including a computer subsystem comprising a system CPU and a drive for storing audio data. An audio controller is provided comprising a drive interface for selectively accessing the audio data from the drive and decoder circuitry for decoding the audio data and generating a decoded signal. The controller is adapted to access the drive to retrieve the audio data and decode the audio data when said computer subsystem is inactive.

In method form, the present invention provides a method for playing audio files in a computer system when said computer system is in an inactive state includes the steps of activating an audio controller if a main CPU of a computer system is inactive; selecting desired audio data; and generating an audio data stream from said selected audio data.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

FIGS. 1–4 depict an example of the preferred MP3 audio controller of the present invention. As an overview, the present invention is directed to an MP3 audio controller 18 adapted to play stored MP3 files. It is intended, in this embodiment, that the MP3 controller of the present invention be integrated within a computer system 10 (e.g., portable lap-top computer) and is adapted with the necessary logic to permit selection, retrieval and play of MP3 files stored locally on the computer, without the necessity of having the computer system turned ON. As used herein, the term inactive is defined to mean a state in which main power is not being supplied (i.e., an OFF state), or when the system is in a sleep mode (such as may be defined under power management specifications). Thus, the present invention provides significant power savings when playing MP3 audio files.

Figure 1:
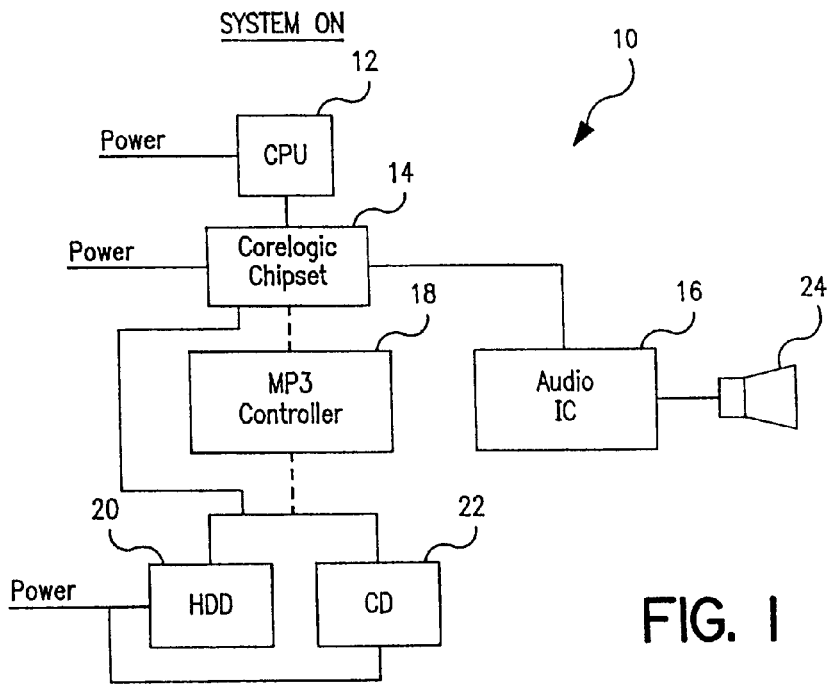
FIG. 1 is an exemplary block diagram of a portable system in an ON state adapted to receive and play MP3 digital audio files, according to one embodiment of the present invention.

FIG. 1 depicts a computer system 10 adapted with the MP3 controller 18 of the present invention in an ON state. Generally, the computer system 10 includes a system CPU 12, a Corelogic chipset 14, a hard disk drive (HDD) 20, a CD-ROM drive (CD) 22, and an audio subsystem (denoted as "audio IC") 16 coupled to a speaker system 24. When main power is being delivered to the system 10 (i.e., the computer is ON), it is preferable that the MP3 controller does not control the play of MP3 files, since such functionality is usually handled by the CPU 12 and an MP3 decoder (typically software). Thus, when the system is ON, the MP3 controller 18 is transparent to commands between the drives 20 and/or 22 and the CPU. Although the figures depict drives 20 and 22 as a hard disk device and a CD-ROM device, respectively, it is intended that any drive mechanism (e.g., RAM drive, DVD drive, backup drive, etc.) known to those skilled in the art can be substituted for these drives 20 and/or 22 without departing from the present invention.

Figure 2:
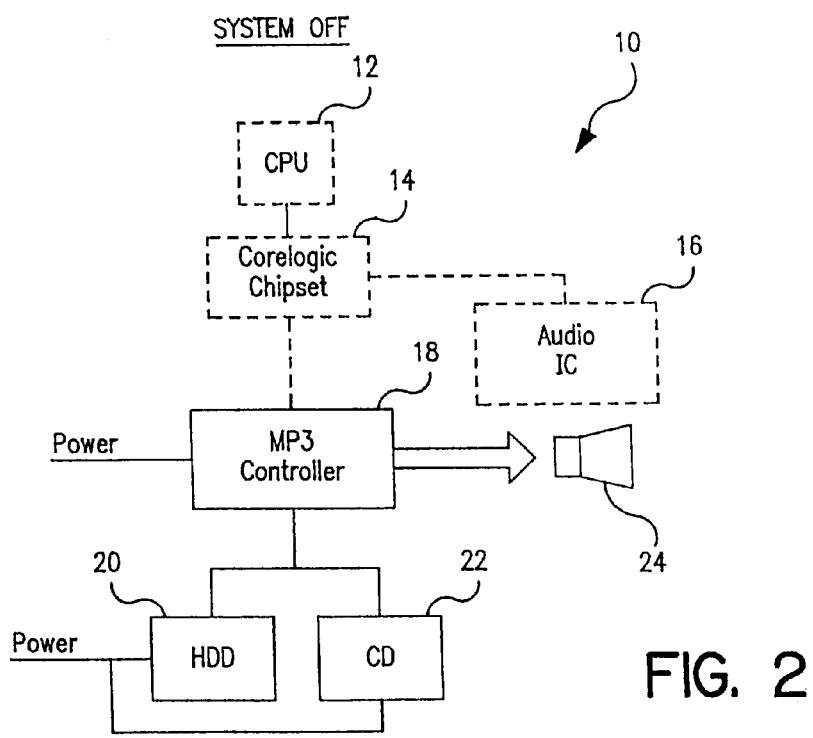
FIG. 2 is an exemplary block diagram of a portable system in an OFF or inactive state adapted to receive and play MP3 digital audio files, according to one embodiment of the present invention.

Conversely, when the system is OFF, as depicted in FIG. 2, the MP3 controller of the present invention operates to permit users to traverse the drives 20 and/or 22 to play MP3 files stored therein directly, without requiring that the CPU 12, CPU chipset 14, or audio subsystem 16 be operating. To that end, as shown in this Figure, system power need only be supplied to the controller 18, and to the drives 20, 22.

Figure 3:
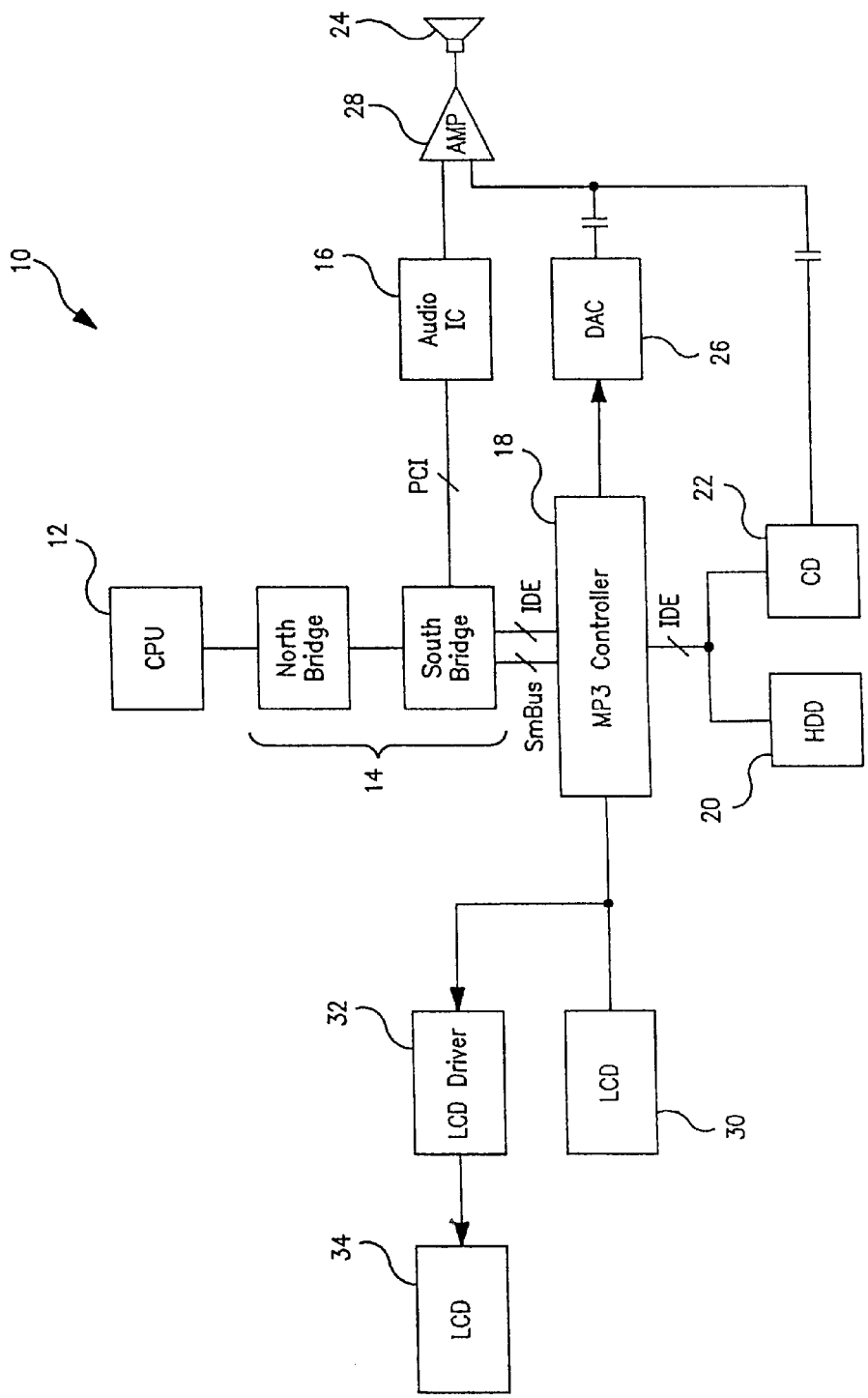
FIG. 3 is a more detailed system block diagram of the invention of FIGS. 1 and 2.

The system block diagram of FIG. 3 represent a more detailed view of the computer system 10, adapted with the MP3 controller of the present invention. As shown, the CPU 12 and Corelogic chipset 14 (depicted as conventional "North Bridge" and "South Bridge" I/O chipsets) communicate with controller 18, using both an SMBus and an IDE bus. As is understood in the art, coupling of the controller 18 to an SMBus permits the user-programmability of the controller 18. The controller 18 also communicates with the drives 20 and/or 22 along the system IDE bus. As will be described in more detail below, controller 18 can include an integrated audio DAC IC, or be adapted to feed a decompressed MP3 file to an external audio DAC 26. The external audio DAC 26 may be included as part of the integrated computer system 10 and/or a subset of the audio IC 16. In either event, the converted audio files are amplified (at amplifier 28) to provide an audible signal to speaker system 24. Additionally, as noted above, controller 18 is adapted to control drives 20, 22 to read MP3 files therefrom. To that end, to permit users to traverse directory structures on the drives, an external LCD display 30 is preferably provided. The LCD display receives directory information from drives 20 and 22 (via controller 18) and displays that information by file name/location. Likewise, the LCD display preferably displays current status information of the controller 18, as will be described in greater detail below. It should be noted that the use of LCD display 30 requires that controller 18 be adapted with appropriate LCD display driver circuitry. It may be the case, however, that the computer system 10 includes and LCD display 34 and LCD driver circuitry 32, in which case, controller 18 may be coupled directly thereto.

Figure 4:
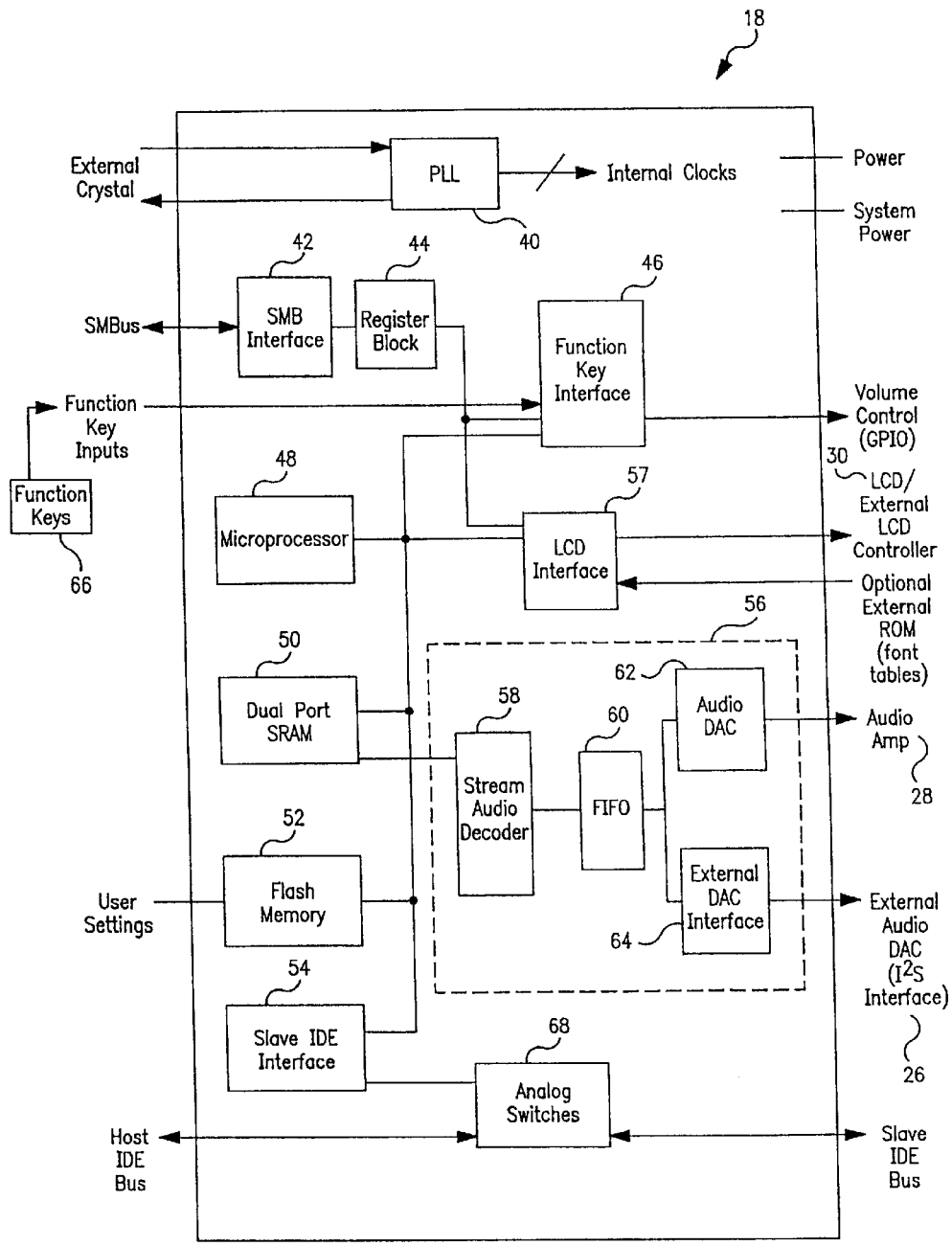
FIG. 4 is a detailed block diagram of the MP3 audio controller of the invention of FIGS. 1 and 2.

FIG. 4 depicts a detailed block diagram of the MP3 controller 18 of the present invention. As an overview, controller 18 includes an internal processor 48, memory 50 and 52, IDE bus interface 54, SMBus interface 42 and MP3 decoding circuitry 56. The overall functionality of controller 18 is the ability to traverse drives 20, 22, permit users to choose a desired MP3 file, decompress the MP3 file and output either a digital or analog signal (to be played by and external amplifier and speaker system). Each of these components depicted in FIG. 4 are described below.

Processor 48 is provided to control the general I/O functions, including access, traversal and retrieval commands for drives 20 or 22. In the preferred embodiment, external function keys 66 are provided to permit users to operate controller 18 and drives 20 or 22 to play MP3 files. Function keys can include play, pause, fast forward, rewind, next track, previous track, scan, etc. (or any combination thereof). Since, in the preferred embodiment, the controller 18 of the present invention permits traversal of directory structures and retrieval of files, it is also preferable to include MENU and ENTER function keys 66. Controller 18 includes a function key interface 46 to interpret commands generated by function keys 66 and generate commands to the processor 48. Instructions for retrieval and play of MP3 files are stored in flash memory 52. These instructions are preferably user-programmable firmware, permanently resident in memory 52. Upon activation of a function key, processor 48 receives instructions from memory 52. To communicate with drives containing MP3 data, a slave IDE interface 54 is provided. Upon user commands generated by the function keys, processor 48 instructs slave IDE interface to control one of the drives to begin traversing the directory structure. The directory structure in which MP3 files are stored by be fixed (for example, a directory may be user-specified and stored in flash memory 52), or the controller can permit users to traverse all directories and files on the drive. Once a user has selected an MP3 file and wishes to play that file (by pressing a play function key, for example), processor 48 instructs the slave IDE interface 54 to retrieve that file from the drive. Preferably, to minimize disk activity once a file selection is obtained, the file is transferred into RAM memory 50. It is most preferable to include dual port SRAM 50, as shown, to store both the audio file and to temporarily store instructions and/or program parameters used by the processor 48. Once the audio file is loaded into memory 50, the data is fed to MP3 decoder circuitry 56.

Decoder circuitry 56 comprises a stream audio decoder 58, buffer memory 60 and either an internal audio DAC 62, or a DAC interface 64 for communicating with an external audio DAC 26. Stream audio decoder 58 receives streaming audio data from memory 50 and decodes the data according to a decoder algorithm stored therein. Alternatively, a decoder algorithm may be stored in flash memory 52, loaded into memory 50 upon activation of the controller, and supplied to the decoder 58. Either way, it is preferable to permit users to update/modify the decoding algorithm. Accordingly, it is preferable that memory 52 or decoder 58 stores an updatable version of the decoder algorithm. In the preferred embodiment, decoder 58 is an MP3 audio file decoder. The output data generated by decoder 58 is decompressed digital audio data, and may include standard digital audio formats like PCM format data. The decoder outputs the decompressed data to a first in—first out (FIFO) buffer 60. If controller 18 is adapted with an internal DAC, data from the buffer 60 is fed into the DAC 60, which generates an analog audio signal, which in turn is fed to amplifier 28 and out to the speaker system (not shown). Alternately, if an external DAC is available in the computer system 10 (for example, as part of the audio IC), the decoder can include an appropriate interface 64. Interface 64 receives digital data from memory 60 and communicates with an external DAC. In a similar fashion, the external DAC 26 generates an analog signal which is supplied to the amplifier 28 and speaker system.

As discussed briefly above, the controller preferably includes an SMBus interface 42 to permit controller 18 to communicate with an SMBus of computer system 10. The SMBus is provided for when the system is ON to pass along function key commands to the system 14 and 12, and is also used to access the flash memory 52 of the controller 18 to permit upgrades and/or changes therein. Once commands are sent to the interface 46, said commands are communicated to the processor 48 for processing. It is also preferable that controller 18 include an LCD interface 57, which is coupled to the SMBus (via register block 44) and processor 48. In this way, the LCD interface 57 can generate signals indicative of both the users actions via function key interface 46, and the processor status. Processor status may include overall operation status (e.g., file loading, decompressing, file not found, etc.) and specific operational parameters (e.g., error status, component failure, etc.). Additionally, it is preferable to display the drive data, which may include directory tree structure, file name(s), etc. Additionally, MP3 files typically contain an ID tag that is descriptive of the title, song, etc. It is preferable that LCD interface 57 be adapted to read and display this tag data. Thus, LCD interface 57 is preferably adapted to display such drive data generate by processor 48.

Controller 18 includes an internal clocking mechanism 40 to clock the circuitry of the controller, and to communicate with timed devices (drives 20 or 22) over a timed bus (e.g., IDE bus). It will be understood by those skilled in the art that more than one clock frequency is typically required, for example, differing clocks supplied to processor 48, decoder 58 and audio DAC 62. The clock mechanism preferably includes a PLL timer that is clocked by a set crystal, as shown.

As described above, the controller 18 of the preferred embodiment operates to play compressed audio files when the system 10 is OFF. To that end, it is preferred that the controller 10 is activated by a user pressing one of the function keys (i.e., system power is supplied to controller 18 by pressing one of the function keys 66). Upon this event, power is coupled to the components of controller 18, and to the drive systems 20 and/or 22. By the same token, if the system 10 is ON, the controller of the present invention includes switches 68. Switches 68 operate to decouple the controller 18 from the IDE bus (as shown in FIG. 3), thereby becoming transparent to the drives 20, 22 and the audio subsystem 16.

It should be noted that the controller 18 is preferably operable with both hard disk drives 20 and CD-ROM drives 22, either of which are conventional storage media for MP3 audio files. Accordingly, function keys 66 also preferably include activation keys for the CD-ROM drive, which may include EJECT, FF/SCAN-FF, RW/SCAN-RW, PLAY, PAUSE, STOP, MENU, ENTER etc.

Figure 5A:
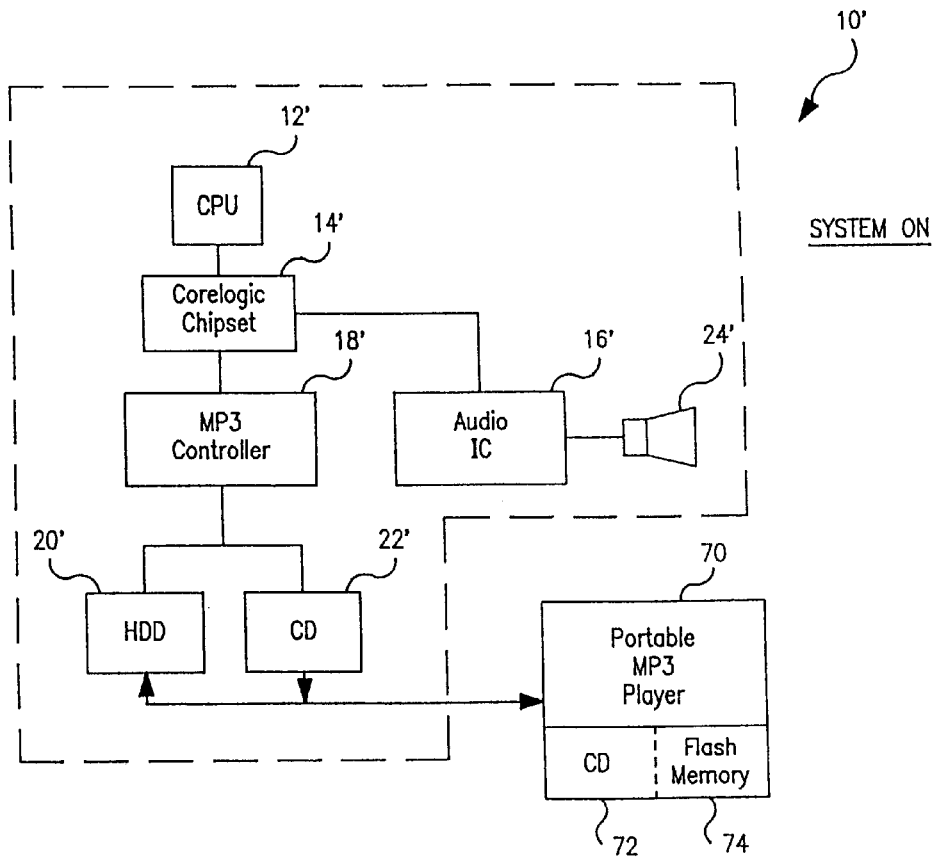
FIG. 5A is an exemplary block diagram of another embodiment of the present invention, depicting a portable system in an ON state, adapted to receive and play MP3 digital audio files, and utilizing an external MP3 decoding device.
Figure 5B:
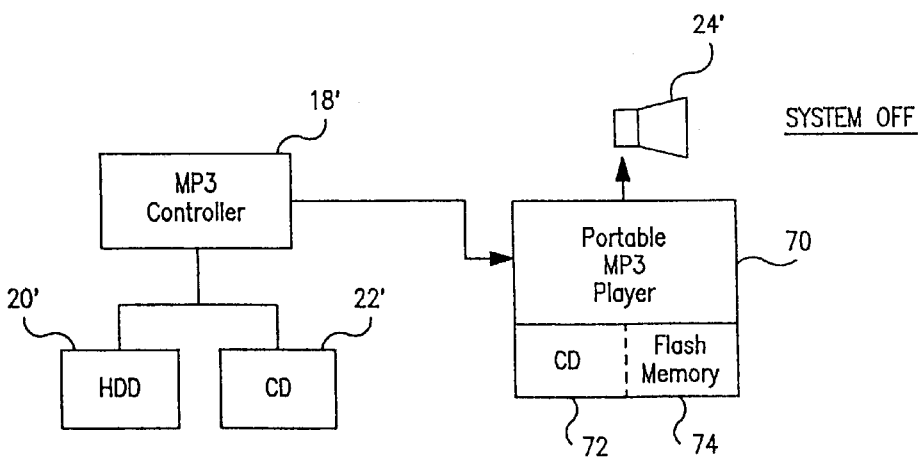
FIG. 5B is an exemplary block diagram of another embodiment of the present invention, depicting a portable system in an OFF or inactive state adapted to receive and play MP3 digital audio files, and utilizing an external MP3 decoding device.

FIGS. 5A and 5B depict another embodiment of the computer system 10' of the present invention. Similar to the embodiment of FIGS. 1 and 2, the present embodiment includes an MP3 controller 18' incorporated into a computer system 10'. In this embodiment, however, the controller 18' is operable with an external MP3 player 70. FIG. 5A depicts the system 10' when power is supplied to the system components: CPU 12', Corelogic chipset 14', Audio IC 16' and drives 20' and/or 22'. When the system is on, MP3 audio files stored on either drive 20' or 22' can be transferred to the external device 70. External MP3 players may include a CD player 72 for reading CDs having MP3 files stored thereon, and/or internal memory 74 for temporary storage of MP3 files. Similar to the previous embodiment, controller 18' preferable is transparent to system 10' when power is ON. In FIG. 5B, the system components are OFF or inactive. Controller 18' operates to decompress MP3 files and send the decompressed data to external player 74. Alternatively, controller 18' can operate to transmit the compressed data to the external player 74, where the data is decompressed into an appropriate audio format by the player 74. It is preferable that the external device 70 include conventional I/O interface (not shown) for connection to controller 18' (via system 10'). For example, controller 18' and player 70 may include conventional RS232 (serial), USB, and/or TCP/IP communications to exchange commands and transfer data therebetween. The decompressed files can be stored in memory 74 of the external player 70.

Controller 18' includes similar components as the controller 18 of the previous embodiment, except that it may not be necessary to include function keys 66 and function key interface 46, since it is likely that portable player 70 includes such functionality. Similarly, it may not be necessary to include display functionality with controller 18' if portable player 70 is equipped with an appropriate display to view drive directory structures and files.

Thus, it is evident that there has been disclosed an audio controller for portable electronic devices that satisfies the aims and objectives stated herein. Those skilled in the art will recognize numerous modifications that may be made to the present invention. For example, although the controller 18 and 18' of the present invention has been described with reference to MP3 audio data, it should be readily apparent that the controller 18 and 18' is independent of the specific format of audio data, and should instead be viewed as a general-purpose audio controller capable of receiving, playing, and/or decompressing any type of audio data, not limited to MP3 format data.

Other modifications are possible. For example, the controller 18 of FIGS. 3 and 4 is depicted and described as being coupled (or decoupled) to an IDE bus, those skilled in the art will recognize that the controller can likewise include other bus interface technologies, depending on the bus configuration of system 10. Thus, for example, controller 18 may be modified to control SCSI drives, and include an SCSI interface for exchanging commands and data according to SCSI protocols. Likewise, it may be desirable to adapt controller 18 with conventional network protocols (e.g., TCP/IP, etc.) for communication with remote systems (not shown) in a conventional network.

Still further modifications are possible. The controller 18 of the present invention has been described herein as including decoding circuitry 56 to decode audio data when the system 10 is OFF. However, it is contemplated that audio files, such as MP3 files could be decoded and stored in a decoded format on the drives 20 and/or 22, for example when the system 10 is ON. If decoded (decompressed) is accessed by the controller 18, this data is stored into memory 50 and supplied directly to audio DAC 62 or audio DAC interface 64. In other words, no decoding is necessary for such data and controller 18 plays the decoded data directly. Those skilled in the art will recognize numerous additional modifications, and all such modifications are deemed within the spirit and scope of the present invention, only as limited by the appended claims.

What is claimed is:

1. A computer system adapted to play audio files, said computer system comprising:
    a computer subsystem comprising a system CPU and a drive for storing audio data; and
    an audio controller comprising a drive interface for selectively accessing said audio data from said drive and memory for storing said audio data, said controller being adapted to access, store and play said audio data when said computer subsystem is in an inactive state; said controller further comprising a switch for switching said controller to an inactive state when said power is supplied to said computer subsystem, and for switching said controller to an active state when said power is not being supplied to said computer subsystem.

2. A computer system as claimed in claim 1, said audio controller further comprising decoder circuitry receiving said audio data and outputting a decompressed stream of audio data.

3. A computer system as claimed in claim 2, said decoder circuitry further comprising a digital to analog circuit receiving said decompressed audio data stream and generating an analog audio signal.

4. A computer system as claimed in claim 2, said decoder circuitry further comprising a buffer memory for temporary storage of said decompressed audio data stream.

5. A computer system as claimed in claim 4, wherein said buffer memory comprises a first-in-first-out (FIFO) memory.

6. A computer system as claimed in claim 2, said controller further comprising interface circuitry to interface said stream of audio data with an external digital-to-analog converter circuit, and said computer subsystem further comprises said external digital-to-analog converter circuit for receiving said decompressed data stream from said interface.

7. A computer system as claimed in claim 1, said controller further comprising an LCD interface for generating signals to an LCD display for displaying directory and file information data associated with said drive.

8. A computer system as claimed in claim 1, said controller further comprising a function key interface operable with a plurality of function keys, said function keys generating user commands to said controller through said function key interface.

9. A computer system as claimed in claim 2, said controller further comprising a processor for controlling the operation said drive and said decoder circuitry.

10. A computer system as claimed in claim 9, wherein said controller further comprises a flash memory for storing data and commands for use by said processor for controlling said drive and said decoder circuitry.

11. A computer system as claimed in claim 1, said controller further comprising an SMBus interface to exchange commands and data along an SMBus.

12. A computer system as claimed in claim 1, said audio data on said drive being stored as a file in a directory, said controller being further adapted to permit users to traverse said drive and select desired directory and file.

13. A computer system as claimed in claim 1, said audio data further comprising tag data indicative of a title, and said controller further comprising a display interface for displaying said tag data upon access of said audio data by said controller.

14. A computer system as claimed in claim 1, said drive comprising a hard disk drive or a CD-ROM drive being adapted to operate of an IDE bus.

15. A computer system as claimed in claim 1, said drive comprising an IDE drive and said drive interface comprising an IDE drive interface for exchanging commands and data between said controller and said drive.

16. A computer system as claimed in claim 2, wherein said audio data comprising MP3 audio data, and said decoder circuitry comprising an MP3 audio data decoder.

17. A computer system adapted to play audio data when said computer system is in an inactive state, comprising:
    a computer subsystem comprising a system CPU and a drive for storing audio data; and
    an audio controller comprising a drive interface for selectively accessing said audio data from said drive and decoder circuitry for decoding said audio data and generating decoded audio data, said controller being adapted to access said drive to retrieve said audio data and decode said audio data when said computer subsystem is in an inactive state; said controller further comprising a switch for switching said controller to an inactive state when said power is supplied to said computer subsystem, and for switching said controller to an active state when said power is not being supplied to said computer subsystem.

18. A computer system as claimed in claim 17, said decoder circuitry further comprising a digital to analog circuit receiving said decoded audio data and generating an analog audio signal.

19. A computer system as claimed in claim 18, said decoder circuitry further comprising a buffer memory for temporary storage of said decoded audio data.

20. A computer system as claimed in claim 19, said controller further comprising a digital-to-analog interface to interface said decoded audio data with an external digital-to-analog converter circuit, and said computer subsystem further comprises said external digital-to-analog converter circuit for receiving said decoded data from said interface.

21. A computer system as claimed in claim 17, said controller further comprising an LCD interface for generating signals to an LCD display for displaying directory and file information data associated with said drive.

22. A computer system as claimed in claim 17, said controller further comprising a function key interface operable with a plurality of function keys, said function keys generating user commands to said controller through said function key interface.

23. A computer system as claimed in claim 22, said controller further comprising a processor for controlling the operation said drive and said decoder circuitry.

24. A computer system as claimed in claim 23, wherein said controller further comprises a flash memory for storing data and commands for use by said processor for controlling said drive and said decoder circuitry, and wherein said commands and data being supplied to said processor upon activation of one of said function keys.

25. A computer system as claimed in claim 17, said controller further comprising an SMBus interface to exchange commands and data along an SMBus.

26. A computer system as claimed in claim 17, said audio data on said drive being stored as a file in a directory, said controller being further adapted to permit users to traverse said drive and select desired directory and file.

27. A computer system as claimed in claim 17, said audio data further comprising tag data indicative of a title, and said controller further comprising a display interface for displaying said tag data upon access of said audio data by said controller.

28. A computer system as claimed in claim 17, said drive comprising a hard disk drive or a CD-ROM drive being adapted to operate of an IDE bus.

29. A computer system as claimed in claim 17, said drive comprising an IDE drive and said drive interface comprising an IDE drive interface for exchanging commands and data between said controller and said drive.

30. A computer system as claimed in claim 17, wherein said audio data comprising MP3 audio data files, and said decoder circuitry comprising an MP3 audio data decoder.

31. A computer system as claimed in claim 17, further comprising memory for storing said audio data.

\* \* \* \* \*